Aug. 18, 1931.  C. N. FAIRCHILD  1,819,085
GAS LOCK
Filed Sept. 14, 1925  3 Sheets-Sheet 2

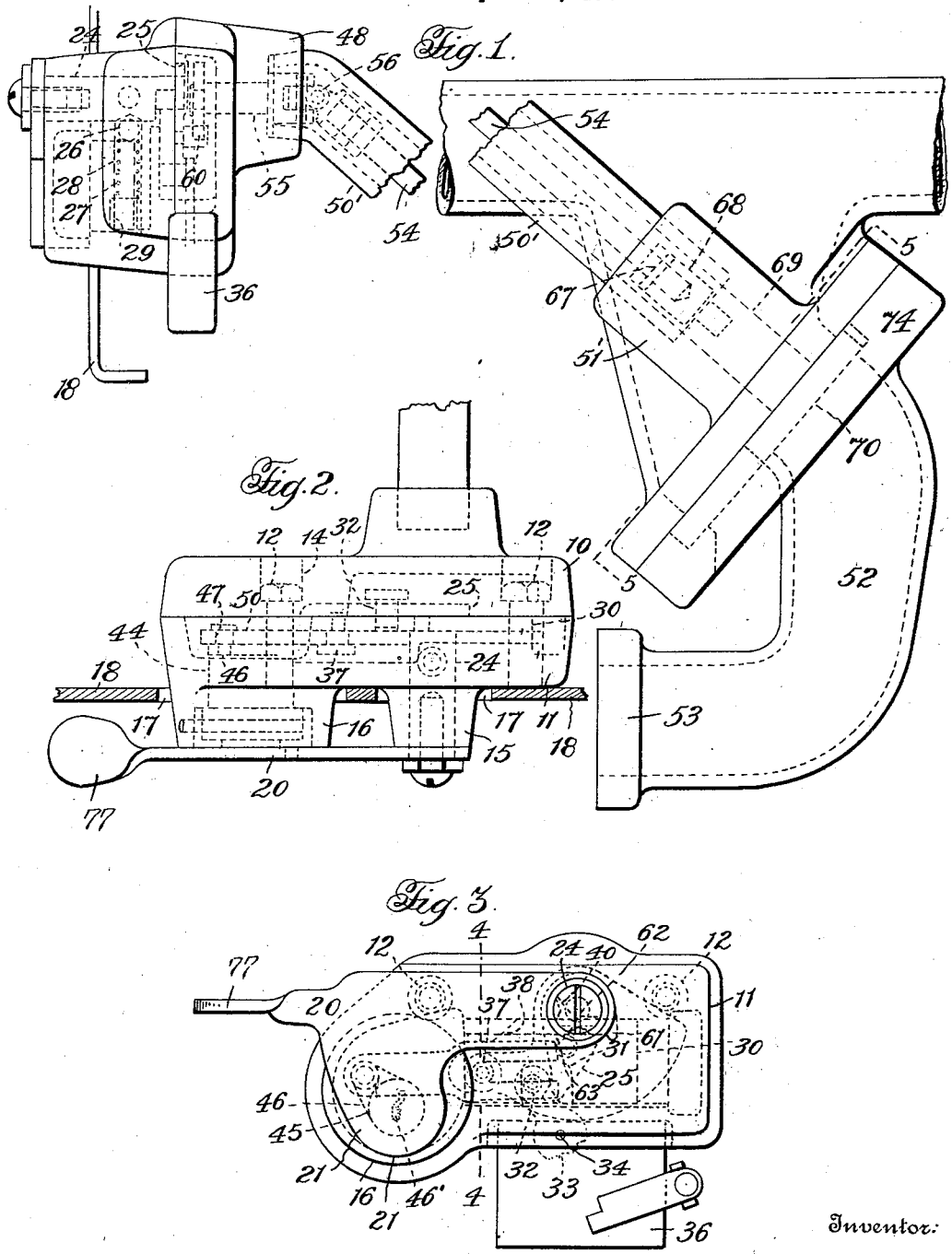

Aug. 18, 1931.  C. N. FAIRCHILD  1,819,085
GAS LOCK
Filed Sept. 14, 1925  3 Sheets-Sheet 3
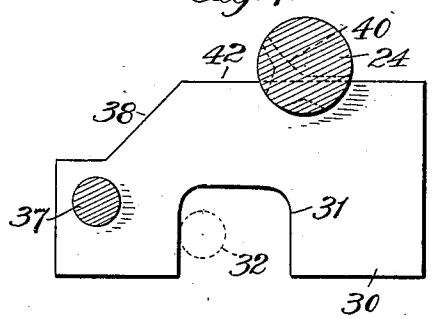
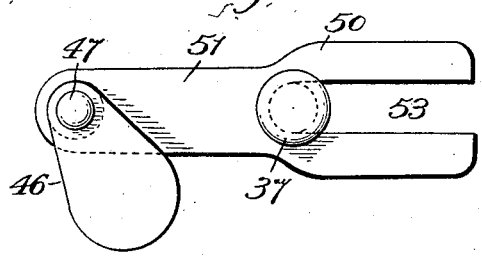
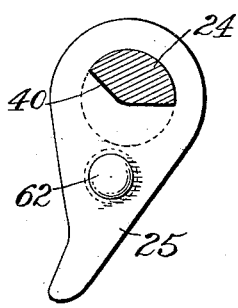
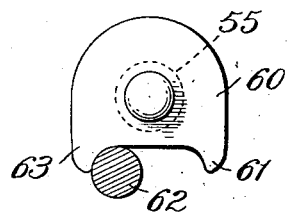
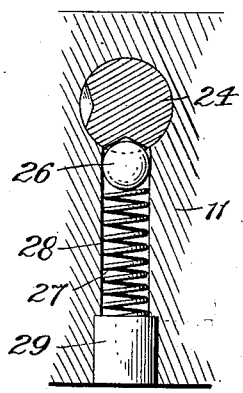

Patented Aug. 18, 1931

1,819,085

UNITED STATES PATENT OFFICE

CHARLES N. FAIRCHILD, OF MILFORD, CONNECTICUT, ASSIGNOR TO FAIRCHILD LOCK CORPORATION, OF NEW YORK, N. Y., A CORPORATION OF DELAWARE

GAS LOCK

Application filed September 14, 1925. Serial No. 56,403.

This invention relates to locks in general and has for its principal object the provision of a lock particularly suited for use on automobiles, enabling the operator to set the device to lock the car by shutting off the gas supply and simultaneously opening the intake manifold to the atmosphere.

A further object of the present invention lies in the provision of an automobile lock which will effectively prevent the automobile being driven away under its own power while not interfering in any manner with the steering of the car.

A still further object of the present invention lies in the provision of an automobile lock so constructed as to pass the requirements of Underwriter's Group I in that the lock in a tamper proof manner prevents the admission of fuel to the engine and simultaneously controls the ignition while not interfering in any manner with the ability of the driver to steer the car while not under its own power as for example, in coasting down a hill or while the car is being towed.

There is now on the market an exceptionally well made Group I lock which meets every requirement as far as insuring against theft is concerned but with which it is not possible under any circumstance to open the ignition circuit without simultaneously locking the car. Such a lock is obviously unsuited to hilly countries in which coasting down hill is permitted or in which the law permits of the braking of the car by means of the engine cylinder compression and the present lock is designed to supplant such a coincidental lock for such drivers as prefer to reserve to themselves the ability to steer when the power is off.

In the drawings:—

Figure 1 is a side view of the entire device.

Figure 2 is a top plan view of the control.

Figure 3 is a front elevation of the control.

Figure 7 shows the sliding plate and associated parts.

Figure 8 shows the fork and crank for moving it.

Figure 9 shows the arm and its stud.

Figure 10 shows the locker and

Figure 11 shows the means for holding the shaft 24 in position.

Figure 4:
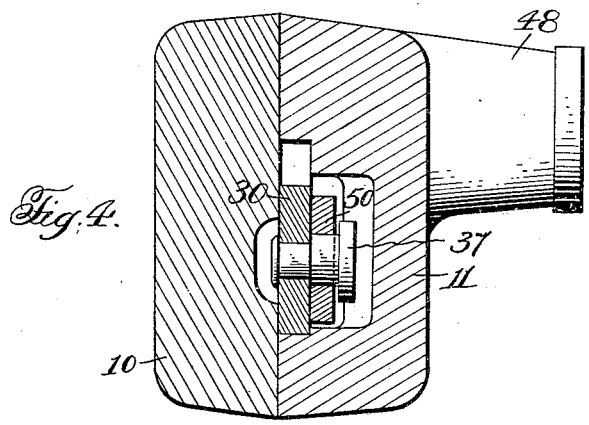
Figure 4 is a section on line 4—4 of Figure 3.
Figure 5:
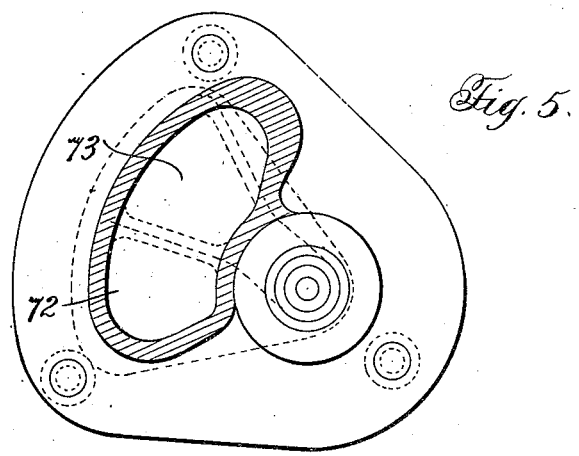
Figure 5 is a section on line 5—5 of Figure 1.
Figure 6:
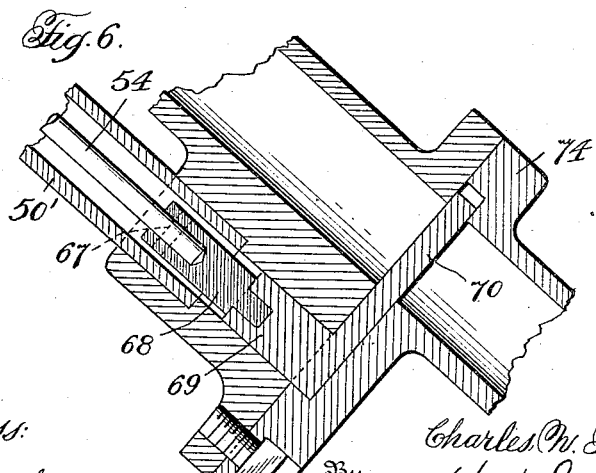
Figure 6 is a cross section taken thru the fuel conduit and the fuel control rod.

The control portion of the device is contained within a housing of two forgings 10 and 11 fastened together by means of the usual one-way screws 12, the heads of which are located quite far beneath the surface of the forgings and the bore above the head is then filled in the usual manner by a plug such as 14. The housing has two frusto-conical but nearly cylindrical bosses 15 and 16 which project thru circular holes 17 in the instrument board 18 so as to give convenient access to the key hole of the lock and to the operating lever 20 which normally covers the key hole, having a rather large depending apron 21 for that purpose.

The main shaft 24 forms the pivot of the lever 20 which is fast to the shaft at one end while at the other end this pivot shaft 24 has permanently secured thereto an arm 25 which serves to throw the ignition switch to "off" position as later described. The lever 20 and the striker arm 25 hold the main pivot shaft 24 against axial movement. The ball 26, serves as a detent to retain the shaft 20 at each limit of its travel, i. e., at locked and at running position by the resilience of the spring 27 held in a bore 28 of the housing as by the plug 29.

At flat plate or slide 30 reciprocates in a groove in the forging 11, partly under control of the lock and partly under control of the arm 25. The slide 30 has a notch 31 in the lower edge to receive the stud 32 carried on the end of the ignition switch lever 33 pivoted as at 34. The type of ignition switch preferred is one which as furnished has a finger pressed tumbler and the only change necessary to use it with this device is to substitute this lever 33 for the usual tumbler. The switch which is denoted as a whole on the drawings at 36 is welded or otherwise secured to the housing. Except as stated it is of well-known and old type and forms no part of the invention as far as its specific internal structure is concerned. At the end of the plate 30 nearest the lock there is a stud 37 and somewhat above this there is a beveled surface 38 which acts to permit further rotation of the pivot shaft 24 after engagement of the flat surface 40 of the milled off end portion of the shaft prevents further rotation of the shaft and lever by striking against the upper surface 42 of the sliding plate 30.

The lock per se is preferably of the revolving cylinder type, in which the key can be removed from the lock in only one position, the barrel of the lock being indicated at 44 while the revolving cylinder is numbered 45 on the drawings and shown as having a zig-zag key hole 46'. On the inner end of the cylinder 45 I permanently secure a crank 46, at the free end of which is a pivotal connection 47 with a sliding member which I will term a fork, this member being numbered 50 on the drawings, the smaller end 51 carrying the pivot stud 47 while the larger end 52 is slotted as at 53 to receive the stud 37 fast on the end of the plate 30.

The device as shown in Figure 3 is in locked position and consequently movement of the cylinder in a clockwise direction will move the pivot member 47 of the crank to the right causing the fork 50 to move to the right and as the stud 37 is at the crotch of the fork, the sliding plate 30 will be moved to the right as well. Inasmuch as the stud 32 on the ignition switch tumbler is in contact with a wall of the notch 31 it will be moved to "on" position upon clockwise movement of the tumbler.

Referring now particularly to Figure 1: I permanently secure to the large rear boss 48 a hardened steel tube 50', the other end of which is secured in permanent fashion to a valve housing 51' preferably consisting of two flanged pieces, the lower portion 52 of which I hereafter call the conduit, this piece being bolted or otherwise secured at its end 53 to the carburetor. Within the hardened steel tube 50 is a gas valve rod 54 connected to the short shaft 55 rotatably mounted in the boss 48, by means of a universal joint 56. A rocker 60 is non-rotatably mounted on the free end of the shaft 55, this rocker having two horns 61 and 63 which are engaged by a stud 62 on the striking arm 25 approximately midway between its end and its pivot.

At the end of the rod 54 distant from the control, the rod is pinned as at 67 to a small plate 68 fitting in a kerf in the integral shaft 69 of the valve 70. The valve 70 is somewhat sector shape and can be oscillated about the axis of 69 so as to close either the air opening 72 or the fuel opening 73, both of these openings being in the flange 74 of the joint or conduit 52. It will be noted that the air opening 72 communicates freely with atmosphere.

The operation of the device is as follows: Assuming that the car has been locked and the driver wishes to drive. The apron 21 of the lever 20 covers the key hole 46. The grip 77 at the end of the lever cannot be raised because the milled portion at the end of the pivot shaft 24 is in substantial engagement with the flat top of the sliding plate 30. The finger piece 77 must therefore be lowered. It can only be lowered 45°, that is until the other flat surface 40 of the milled end is brought into contact with the top of the sliding plate 30, but this movement is sufficient to uncover the key hole. During this motion of the lever 20 the stud 62 on the arm 25 moves from against the left hand horn 63 on the rocker 60 and into position just to engage the right hand horn 61 of the rocker.

Upon turning the key 90° in a clockwise direction the fork and slide are moved to the right as seen in Figure 3 and the ignition circuit is closed by the turning of the stud 32 on the end of the ignition switch tumbler to the right by engagement with the slide 30. These various movements advance the slide 30 to a point where the 45° beveled edge 38 is in registry with the surface 40 of the milled portion of the shaft and consequently the shaft can be still further turned. By bringing the surface 40 into engagement with the sliding edge 38, i. e., in completing the 90° movement permitted the lever 20, the stud 62 which has already been brought into contact with the right hand horn 61 now moves the rocker to revolve the shaft 54 thru 45° and to move the sector end of the valve 70 from its former position of closing the fuel opening 73 to the running position where the sector entirely closes the air opening 72. The key may be taken out either now or just before this last movement, it being immaterial which, this naturally requiring that the lock cylinder 45 be returned to initial position, carrying with it the fork 51 but not the slide 30. I prefer not to have a spring return the lever 20 to position as it can readily be done by hand, and furthermore the driver may desire to leave the key in the lock and leave the lever down while running, but in any event the key must be removed from the lock before it is possible to close the gas supply or to shut off the ignition.

Supposing now we come to a hill and the driver desires to coast down the same, the key, if in the lock, is removed and the lever is brought with a single motion to the position shown in Figure 3, the stud 62 moving freely from one horn to the other thru 45° of movement and then engaging and moving the left hand horn so as to open the air inlet 72 thru the latter 45° of movement. During this movement the arm 25 which is fast to the shaft 24 and therefore moves with the lever 20 strikes the stud 32 of the ignition switch tumbler and does two things: It snaps the switch to "off" and returns the slide 30 to the position shown in Figure 3, the fork has previously moved back with the lock when the lock cylinder was returned to key removing position but the slide does not follow the fork as its stud 37 is free to move in the slot 53 of the fork.

What I claim is:—

1. In an automobile ignition and gas lock, an ignition switch, a valve controlling alternate admission of air and fuel to the engine, key control means for simultaneously throwing the switch to ignition circuit closing position and moving the valve to fuel admitting position and also for moving the valve to position to close the fuel supply and establish communication between the engine cylinders and atmosphere and simultaneously throwing the switch to ignition circuit opening position, and means for preventing movement of the valve from one position to the other without first removing the key from the lock.

2. In combination, a pivoted tumbler, a key operated lock for moving said tumbler in one direction, an arm for moving said tumbler in return direction, and means operatively connected to said arm to bar entry to the key hole when said arm is in switch returning position.

3. In a device of the character described, an ignition switch, a rotatable rod controlling the admission of fuel to the engine cylinder, a manually oscillatable shaft, means including a lost motion device operatively connecting said shaft and said rod, a key controlled lock for moving said switch to on position and means operable only when the key is withdrawn from the lock for moving the switch to off position.

4. A valve adapted to close alternately a fuel conduit and an air passageway, a rod operatively connected to said valve, a rocker arm fast to said rod and having two spaced horns, a crank arm having a stud thereon and adapted to engage one of said horns to move said valve to fuel opening and air closing position and to engage the other horn to move said valve to air closing and fuel admitting position.

5. The device of claim 4, and an ignition switch, in which the stud carrying arm operates said ignition switch upon contact with one of said horns.

6. In a device of the character described, a key operated lock having a rotatable cylinder, a crank on the end of said cylinder, a forked member pivoted to said crank, a sliding plate having a stud thereon riding in the fork slot of said member and having a wide slot in one side, an ignition switch operating member extending into the slot of said plate and projecting from one side thereof, a shaft, an arm on said shaft adapted to engage said switch member, and a handle on said shaft adapted to cover the key hole of said lock when the parts are in locked position, whereby said arm must be moved away from said switch member before said lock may be operated in one direction and whereby the lock and fork must be moved to locked position and the key removed before the handle can be turned to move the switch to "off" position.

7. In a device of the character described, a carburetor, an engine cylinder, an ignition circuit, key operated means for closing said ignition circuit, means including a lost motion device for establishing communication between the carburetor and the engine cylinder after movement of said lock to circuit closing position and means including said lost motion device for preventing return of said means until after the key has been returned to initial position and withdrawn from said lock.

8. In combination, a fuel passage, an air passage, a valve for controlling either passage selectively, manually operated means for opening and for closing said valve, a lock, and means operatively connected to said lock for preventing movement of said valve from either position to the other without first turning said lock.

9. In an automobile having a dashboard, an engine cylinder, a carburetor, a passageway leading from said carburetor to said engine and a passageway from said engine to atmosphere; a valve in said first mentioned passageway adapted to close that passageway and to establish communication between the engine cylinder and atmosphere thru the other passageway, a lock housing on the dashboard, lock mechanism within said housing, and means operatively connecting said locking mechanism with said valve, said valve operating means including a manually controlled member adapted to cross the path of the key.

10. In an automobile, a valve for establishing communication between the engine cylinders and the atmosphere, means including a manually operated rock shaft for operating said valve, a sliding plate, an ignition switch lock, mechanism connecting said sliding plate and said lock and means on said rock shaft and on said sliding plate for preventing completion of turning movement of the rock shaft until after the sliding plate has been advanced a predetermined amount.

11. In combination, a fuel passageway, a valve in said passageway, means for opening and closing said valve, a lock, and means operatively connected to the lock for preventing movement of said valve from either position to the other without first turning said lock.

12. In an internal combustion motor, a passage leading from the motor cylinder to atmosphere, a valve for opening and closing the passageway at will, and two cooperating means both of which are required to be manually operated independently to move the valve from either position to the other.

13. In a vehicle, an internal combustion motor, an ignition circuit, a passageway leading from the motor to atmosphere, a valve in said passageway, and means including a key controlled lock and a manually operated lever for moving the valve from passageway open or theft preventing position to passage closed or running position and simultaneously closing the ignition circuit.

14. In a vehicle, an internal combustion motor, an ignition circuit, a passage leading from the motor to atmosphere, a valve in said passage, and means including a key controlled lock for moving the valve from passage closed or running position to passage open or theft preventing position and simultaneously breaking the ignition circuit.

15. The device of claim 14 in which the means includes a manually operated lever.

In testimony whereof I affix my signature.

CHARLES N. FAIRCHILD.